(12) United States Patent
Rossi et al.

(10) Patent No.: US 10,870,440 B2
(45) Date of Patent: Dec. 22, 2020

(54) SENSORIZED AXLE BOX-BEARING UNIT FOR SUPPORTING A RAILWAY AXLE

(71) Applicant: Aktiebolaget SKF, Gothenburg (SE)

(72) Inventors: Mario Rossi, Rivoli (IT); Alberto Mazzarino, Turin (IT); Andrea Roberti, Turin (IT); Riccardo Vana, Buriasco (IT)

(73) Assignee: Aktiebolaget SKF

( * ) Notice: Subject to any disclaimer, the term of this patent is extended or adjusted under 35 U.S.C. 154(b) by 410 days.

(21) Appl. No.: 15/464,929

(22) Filed: Mar. 21, 2017

(65) Prior Publication Data
US 2017/0282940 A1    Oct. 5, 2017

(30) Foreign Application Priority Data

Apr. 1, 2016  (IT) ................................ 102016633785

(51) Int. Cl.
*B61F 15/20* (2006.01)
*B61F 5/20* (2006.01)
(Continued)

(52) U.S. Cl.
CPC ............... *B61F 15/20* (2013.01); *B61F 5/20* (2013.01); *F16C 35/042* (2013.01);
(Continued)

(58) Field of Classification Search
CPC .......... B61F 15/00; B61F 15/02; B61F 15/04; B61F 15/06; B61F 15/12; B61F 15/20; B61F 15/26; B61F 15/28
See application file for complete search history.

(56) References Cited

U.S. PATENT DOCUMENTS

| | | | |
|---|---|---|---|
| 3,741,614 A | 6/1973 | Judge | |
| 2004/0173033 A1* | 9/2004 | Gilbert | ..................... B61K 9/08 73/862 |
| 2014/0093199 A1* | 4/2014 | Fujiwara | ................. B61F 15/12 384/448 |

FOREIGN PATENT DOCUMENTS

| | | |
|---|---|---|
| CN | 101105202 | 1/2008 |
| CN | 101535817 | 9/2009 |
| | (Continued) | |

OTHER PUBLICATIONS

China Office Action dated Oct. 30, 2019 for corresponding China Patent Application No. 201710212840 filed Apr. 1, 2017.
(Continued)

*Primary Examiner* — Robert J McCarry, Jr.
(74) *Attorney, Agent, or Firm* — Reed Smith LLP

(57) ABSTRACT

An axle box-bearing unit for an axle including a housing element and a sensor unit having a sensor module, a connection piece for connecting to a processing unit and a flexible electrical cable joining the sensor module and the connection piece into a single part. The housing element is delimited by an annular lateral wall provided with a transversal through hole engaged by a plug fitted in a fluid-tight manner to the flexible electrical cable between the sensor module and the connection piece. A first plate provided with a second through hole is rigidly connected to the lateral wall of the housing element, with the second hole aligned with the first hole and crossed through by the plug, a second U-shaped plate is fitted astride of the plug to connect with one end of same that projects radially from the holes and is rigidly connected to the first plate.

10 Claims, 5 Drawing Sheets

(51) Int. Cl.
    *F16C 35/04*    (2006.01)
    *F16C 41/00*    (2006.01)
(52) U.S. Cl.
    CPC ........ *F16C 41/008* (2013.01); *F16C 2233/00* (2013.01); *F16C 2326/10* (2013.01)

(56) References Cited

FOREIGN PATENT DOCUMENTS

| | | |
|---|---|---|
| CN | 102369445 | 3/2012 |
| CN | 103707901 | 4/2014 |
| CN | 104169689 | 11/2014 |
| EP | 0976638 A1 | 2/2000 |
| EP | 1211500 A1 | 5/2002 |
| EP | 1398636 | 3/2004 |
| FR | 3001538 | 1/2014 |
| JP | 2004354231 | 12/2004 |
| JP | 2005330994 | 12/2005 |
| JP | 2006036178 | 2/2006 |
| KR | 20130123130 | 11/2013 |
| WO | 200051869 | 9/2000 |
| WO | 200765413 | 6/2007 |
| WO | 2007065413 A1 | 6/2007 |
| WO | 2010116206 | 10/2010 |

OTHER PUBLICATIONS

China Office Action dated Aug. 20, 2018 for corresponding China Patent Application No. 2015107896293 filed Nov. 17, 2015.
European Search Report dated May 15, 2019 for corresponding European Application No. 15189656.
French Search Report dated Mar. 1, 2019 for corresponding French Application No. 1752657.

* cited by examiner

SENSORIZED AXLE BOX-BEARING UNIT
FOR SUPPORTING A RAILWAY AXLE

CROSS REFERENCE TO RELATED APPLICATIONS

This application claims priority to Italian patent application no. 102016000033785 filed on Apr. 1, 2015, the contents of which are fully incorporated herein by reference.

FIELD OF THE INVENTION

The present invention relates to a sensorized axle box-bearing unit for supporting a railway axle.

BACKGROUND OF THE INVENTION

As is known, for example from U.S. Pat. No. 3,741,614, a railway vehicle is supported by a series of axles onto which the wheels are press fitted. Each end of the axle is supported rotatably by a axle box-bearing unit comprising an axle box connected using appropriate suspension means to the railway carriage and a rolling bearing. An inner ring of the rolling bearing is rigidly attached to one end of lesser diameter of the axle, referred to as the journal, and rotates with same, while an outer ring of the rolling bearing is positioned inside a housing element of the axle box, which is generally annular and stationary when in use, and that also bears a sealing ring towards the outside of the axle box to protect the rolling bearing. According to the subject matter shown in WO2007/065413, a sensor module is attached to the sealing ring, said sensor module being part of a one-piece sensor unit designed to enable the sensor module to be inserted into the housing element from the outside inwards through a radial hole formed in a lateral wall of the housing element, said radial hole being closed when in use by a flanged portion of the sensor unit that is rigidly attached to the outside of the housing element.

The solution described has a number of drawbacks. Firstly, the sensor unit, due to the presence of the flanged portion, is relatively costly and complex to manufacture, and is particularly difficult to assemble since the flanged portion is liable to interfere with other elements of the axle when inserting the sensor unit into the housing element, or in any case is liable to hinder such insertion, in particular where space is limited. Secondly, the seal against potential external contaminants provided by the sensor unit may be less than perfect, thereby potentially enabling moisture to enter the housing element. Thirdly, an electrical data-transmission cable that is part of the sensor unit and that connects the sensor module to a connection piece for sending data to an electronic processing unit may, in use, become entangled with or in any case interfere with the journal or other moving parts of the unit.

BRIEF SUMMARY OF THE INVENTION

The present invention is intended to provide a sensorized axle box-bearing unit for supporting a railway axle that addresses the aforementioned drawbacks, and that in particular is easy to assemble, that provides a reliable seal against external contaminants, and that prevents potential interference between the electrical data-transmission cable of the sensor unit and moveable parts of the axle box-bearing unit.

The invention proposes a sensorized axle box-bearing unit for supporting a railway axle having the features listed in the attached claims.

BRIEF DESCRIPTION OF THE SEVERAL VIEWS OF THE DRAWING

The invention is described below with reference to the attached drawings, which show a non-limiting example embodiment of same, in which.

DETAILED DESCRIPTION OF THE INVENTION

Figure 1:
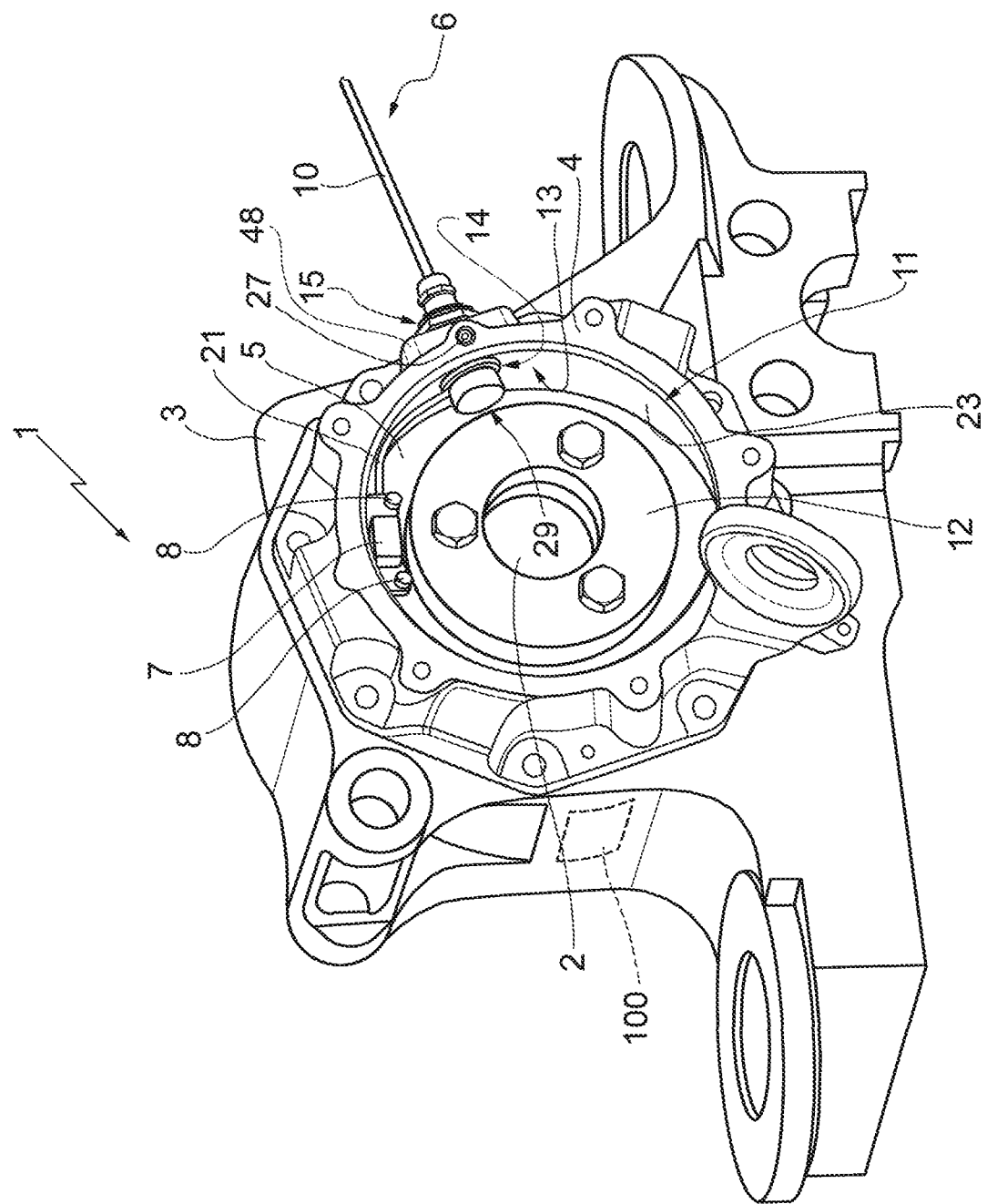
FIG. 1 is a schematic perspective three-quarter side view of an axle box-bearing unit for a sensorized railway axle according to the invention.
Figure 2:
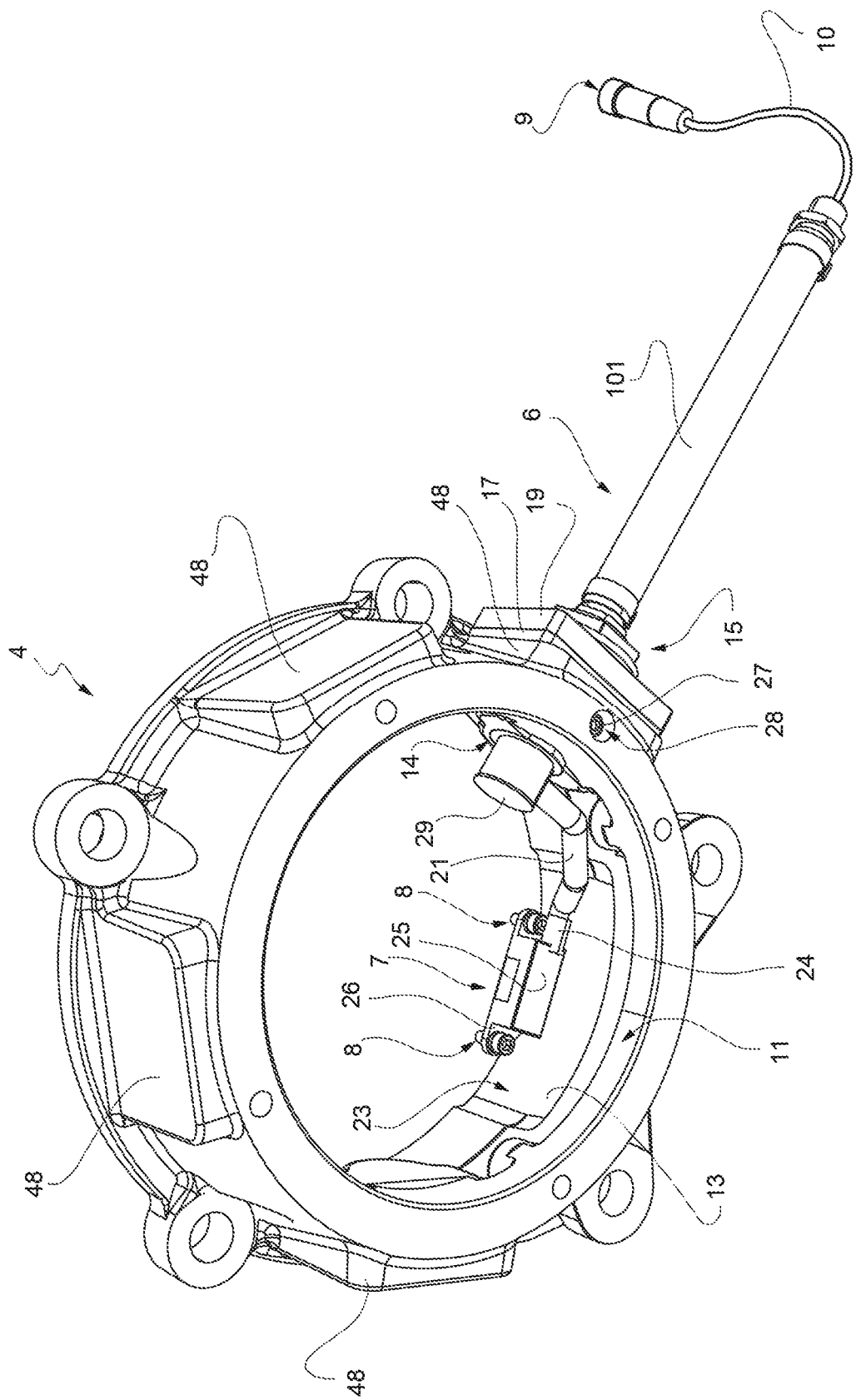
FIG. 2 is a magnified perspective view of respective components of the axle box-bearing unit in FIG. 1.
Figures 3, 4:
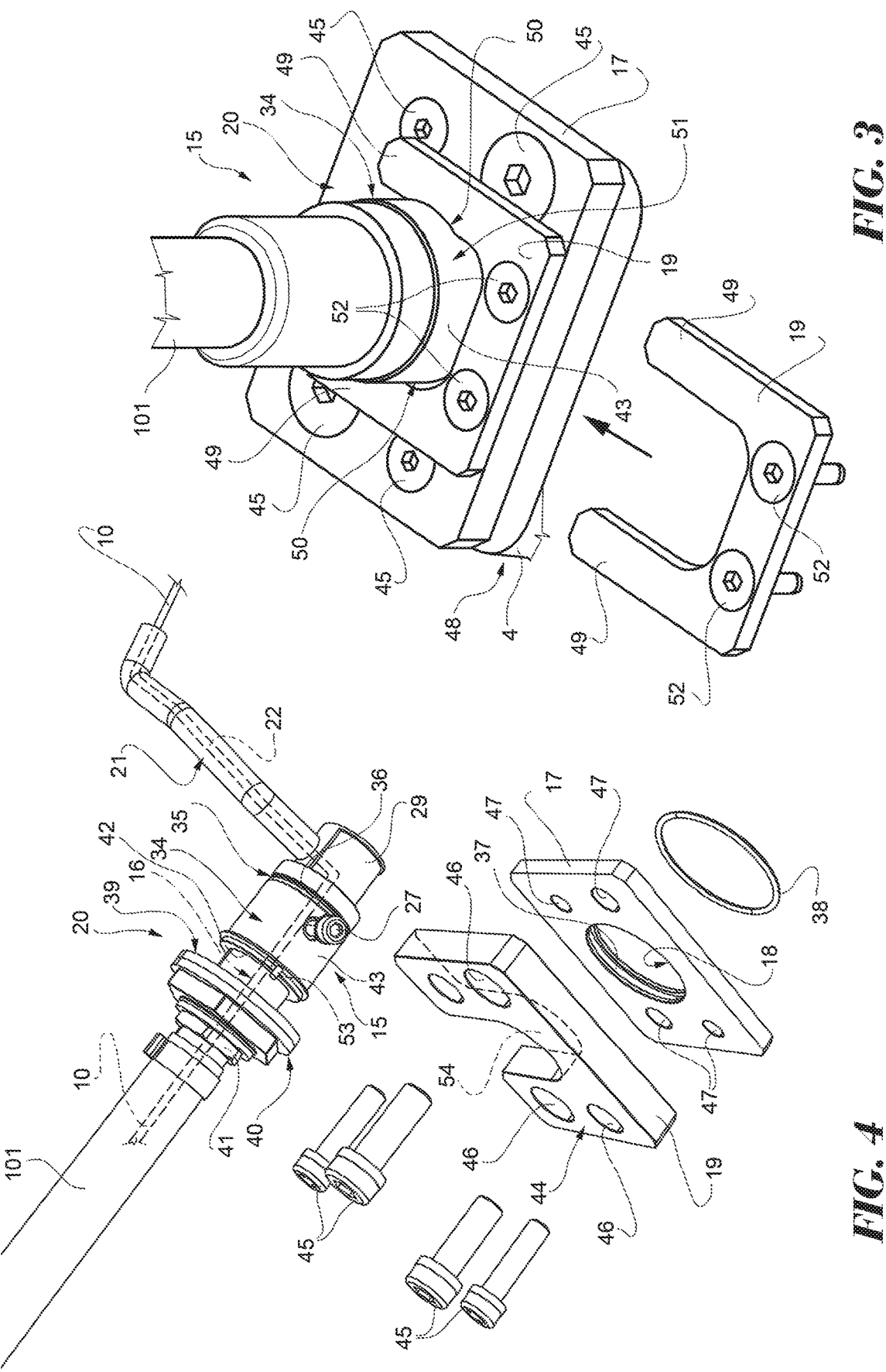
FIG. 3 is a further magnified perspective schematic view of a detail of the assembly of the components in FIG. 2.
FIG. 4 is an exploded perspective schematic view of the components in FIG. 2 according to a possible assembly variant of one of the components in FIG. 2.

In FIGS. 1 to 3, reference sign 1 indicates (as a whole) a sensorized axle box-bearing unit for supporting an axle 2 of a railway vehicle, that is of a known type and as such, for the sake of simplicity, is not shown in detail.

The unit 1 includes a railway axle box 3 designed to rotatably contain one extremity of reduced-diameter or journal of the axle 2 by means of a rolling bearing 100, which is known and illustrated only partially using hatching for the sake of simplicity, which in turn comprises an inner ring that can be assembled on the journal and an outer ring that is rigidly connected to a housing element 4 of the axle box 3 and that is stationary when in use, that, in the non-limiting the example shown, also includes a sealing ring 5 positioned towards the outside of the axle box 3 and about the axle 2 that is intended to protect the rolling bearing 100.

The axle box-bearing unit 1 also includes a sensor unit 6 in turn including a sensor module 7 assembled in conjunction with the sealing ring 5 in a known manner using screws 8 and containing a plurality of transmission elements for monitoring the axle 2 and the bearing, which are known and therefore not illustrated for the sake of simplicity, a connection piece 9 (FIG. 2) for connection to an electronic processing unit of the railway vehicle, which is also known and therefore not illustrated for the sake of simplicity, and a flexible electrical data-transmission cable 10 connecting in a single part the sensor module 7 and the connection piece 9 (see FIG. 2). Hereinafter, the expression "in a single part" means that the three elements 7, 9 and 10 (the screws 8 may also be assembled separately) are connected mechanically and inseparably without any intermediate mechanical or electrical connection, such as to form a single complete element.

The housing element 4 has a front opening 11 through which the axle 2 can be accessed, along with the related rolling bearing 100, which is secured axially to the axle 2 by means of a cover 12 and the sealing ring 5. The housing element 4 is bounded by an annular lateral wall 13 provided with a transversal through hole 14, which is cylindrical in the example illustrated, formed radially through the annular lateral wall 13.

In the non-limiting example shown, the hole 14 is larger than the sensor module 7 and the connection piece 9, i.e. the transverse dimensions of same, in this case the diameter, are greater than the dimensions transverse to the electrical cable 10 of the sensor module 7 (or of the components of same, as detailed below) and the dimensions transverse to the electrical cable 10 of the connection piece 9, such that the sensor unit 6 can be assembled, if required, through the hole 14 either from the outside towards the inside of the housing element 4, or, according to a variant not illustrated and covered by another patent application from the same applicant, from the inside towards the outside, passing through the opening 11 before assembling the cover 12.

According to one aspect of the invention, the sensor unit 6 has a plug or adapter 15 fitted in a fluid-tight manner on a stretch 16 (FIG. 4) of the flexible electrical cable 10 arranged between the sensor module 7 and the connection piece 9. The plug or adapter 15 is designed to be inserted radially into the through hole 14 from the outside inwards or from the inside outwards, in both cases to close the through hole 14 in a fluid-tight manner.

The sensor unit 6 is therefore mounted within the housing element 4 through the first transversal through hole 14.

Also with reference to FIGS. 4 to 6A and 6B, and according to one aspect of the invention, the axle box-bearing unit 1 comprises, in combination with the elements described above, a first plate 17 provided with a second through hole 18 (FIGS. 4 and 5) formed transversely through the plate 17, which is rigidly connected to the annular lateral wall 13 of the housing element 4 and outside same, the second through hole 18 being aligned coaxially with the first through hole 14, the plug or adapter 15 passing entirely through the plate 17, either through the hole 14 or the hole 18.

According to the invention, the axle box-bearing unit 1 further comprises a second, U-shaped plate 19, which is fitted astride of the plug or adapter 15 to couple with a first end 20 of the plug 15 (FIGS. 3-5), projecting radially from the first through hole 14 and the second through hole 18 to the outside of the housing element 4. According to the invention, the plate 19 is rigidly and removably attached to the first plate 17 to mechanically secure the plug 15 through the lateral wall 13 of the housing element 4.

As shown, the plug 15 is secured mechanically by the plight 19 such that the plug 15 of the sensor unit 6 has a second end 29 opposite the first end 20, said second end 29 being arranged inside the housing element 4 and projecting radially from the annular lateral wall 13 into the housing element 4.

A pipe 21 projects from a first side of the second end 29 of the plug 15 in a direction tangential to the annular lateral wall 13 of the housing element 4, said pipe 21, which is preferably flexible, having transverse dimensions that are less than the transverse dimensions of the holes 14 and 18 and containing a second stretch 22 (FIG. 4) of the flexible electrical data-transmission cable 10 between the plug 15 and the sensor module 7 such that said second stretch 22 of the flexible electrical data-transmission cable 10 is bent sideways in relation to the plug 15 and arranged adjacent (obviously via the pipe 21) to an inner lateral surface 23 of the lateral wall 13 of the housing element 4.

The sensor module 7 is rigidly attached to a first end 24 (FIG. 2) of the pipe 21, opposite to the plug or adapter 15.

According to the embodiment shown in FIG. 2, the sensor module 7 comprises a casing 25 and a fixing flange 26 formed integrally in one piece with the casing 25 and arranged parallel to a maximum dimension of the casing 25 that extends lengthwise and substantially parallel to the first end 24 of the pipe 21. In this case, the sensor module 6 is lowered since the transverse dimensions of same, perpendicular to the longitudinal direction, are smaller than the dimensions of the first hole 14 and the second through hole 18. The sensor module 7 can therefore be passed through the holes 14 and 18, even in the presence of the fastening bracket 26 since this latter is arranged parallel to the casing 25 and only negligibly increases the transverse dimension of same.

However, there are sensor modules in which the flange 26 is arranged perpendicular/transversal to the casing 25 for a range of structural reasons relating to the sensor module.

Figure 6A:
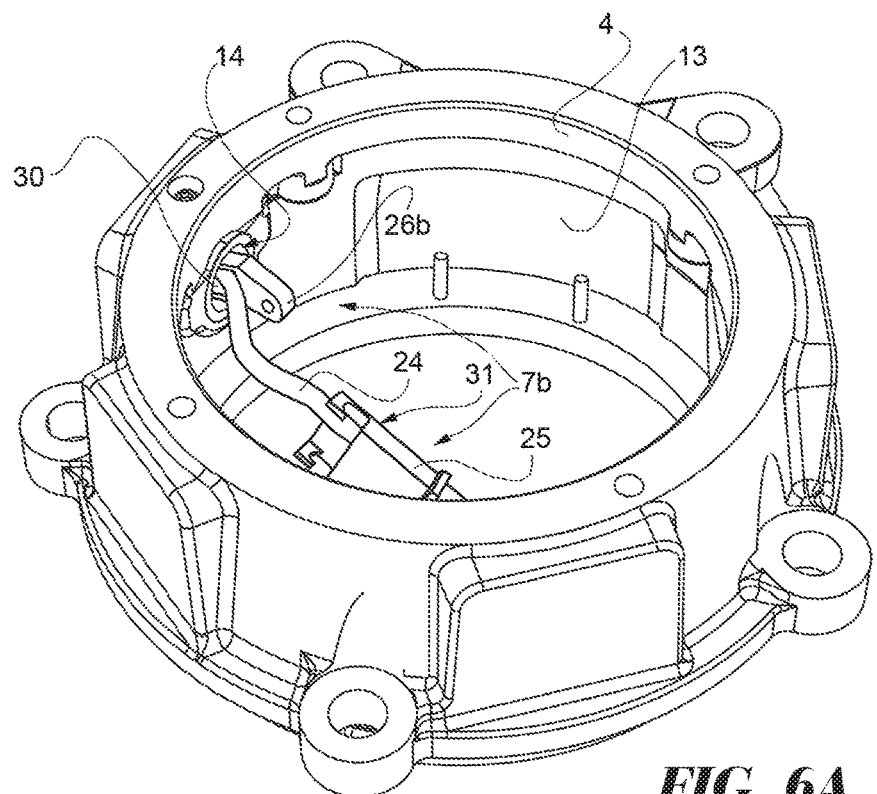
Figure 6B:
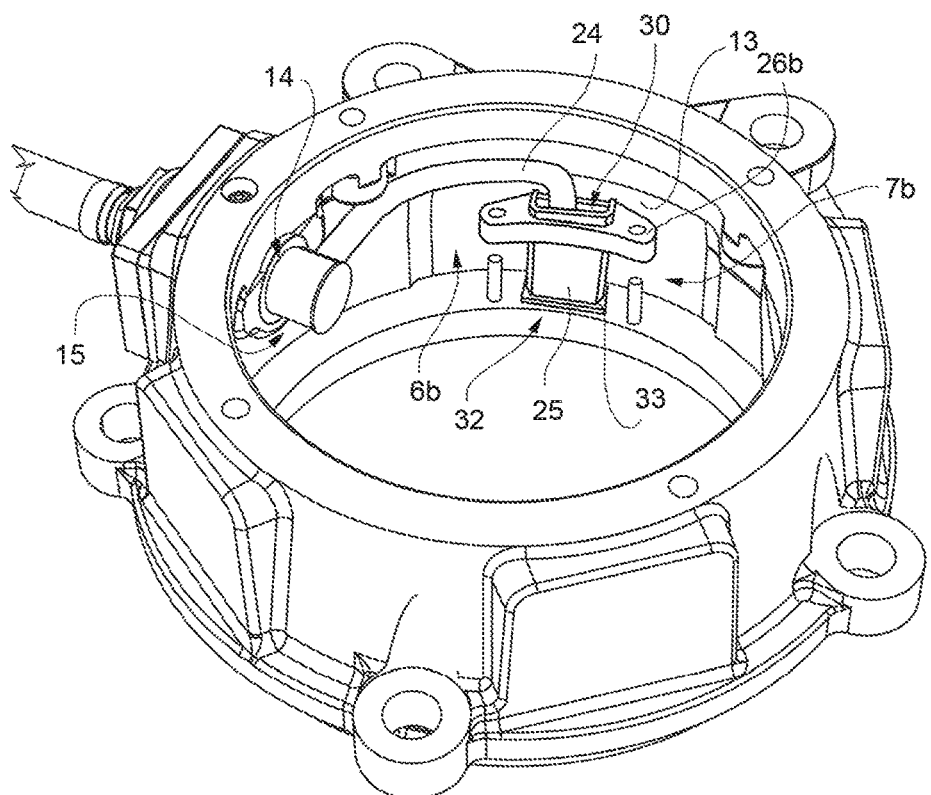

This variant is illustrated in FIGS. 6A and 6B, in which the sensor unit carried out according to the invention is indicated using reference sign 6b. In this case, the sensor unit includes a sensor module 7b that is integrally connected without interruptions to the connection piece 9 via the electrical cable 10. The sensor module 7b includes a casing 25 and a fastening flange 26b. The substantially parallelepipedic casing 25 is arranged, in a longitudinal direction of the maximum extension of same, substantially parallel to the pipe 21 and the fastening flange 26b is arranged transversal to the casing 25 and to the flexible pipe 21 when in use.

However, according to this aspect of the invention, the fastening flange 26b is formed as an element separate from the casing 25 and is provided with a through slot 30 used to fit the flange 26b to the pipe 21, said slot being able to slide along said pipe. The slot 30 can also be used to slide the flange 26b longitudinally onto the casing 25 from the side of the first end 31 of the casing oriented towards the pipe 21 as far as the second end 32 of the casing 25 that is opposite the first end 31 and is provided with a stop rim 33.

The transverse dimensions of the casing 25 and of the flange 26b of the variant 6b of the sensor unit are designed to be less than the transverse dimensions of the first and second through holes 14 and 18, when the slot 30 engages the flexible pipe 21 but not the casing 25 and the flange 30 is/may be arranged crookedly in relation to the pipe 21. This result can also be achieved by correctly determining the length of the flange 26 b such that the projection of same perpendicular to the pipe 21 when the flange 30 is arranged at an angle to the pipe 21 is less than the diameter of the holes 14 and 18, which is preferably identical.

The plug or adapter 15 is bounded by a cylindrical lateral wall 34 (FIGS. 4 and 5) that is coupled with the through holes 14 and 18 and that is provided at the first through hole 14 with a first annular seat 35 designed to receive a first annular O-ring sealing element 36, which in use is packed between the first through hole 14 and the cylindrical lateral wall 34 of the plug.

Furthermore, the first plate 17 is provided, at the second through hole 18, with a second annular seat 37 designed to receive a second annular O-ring sealing element 38 (FIG. 4), which in use is packed between the second through hole 18 and the cylindrical lateral wall 34 of the plug 15.

Figure 5:
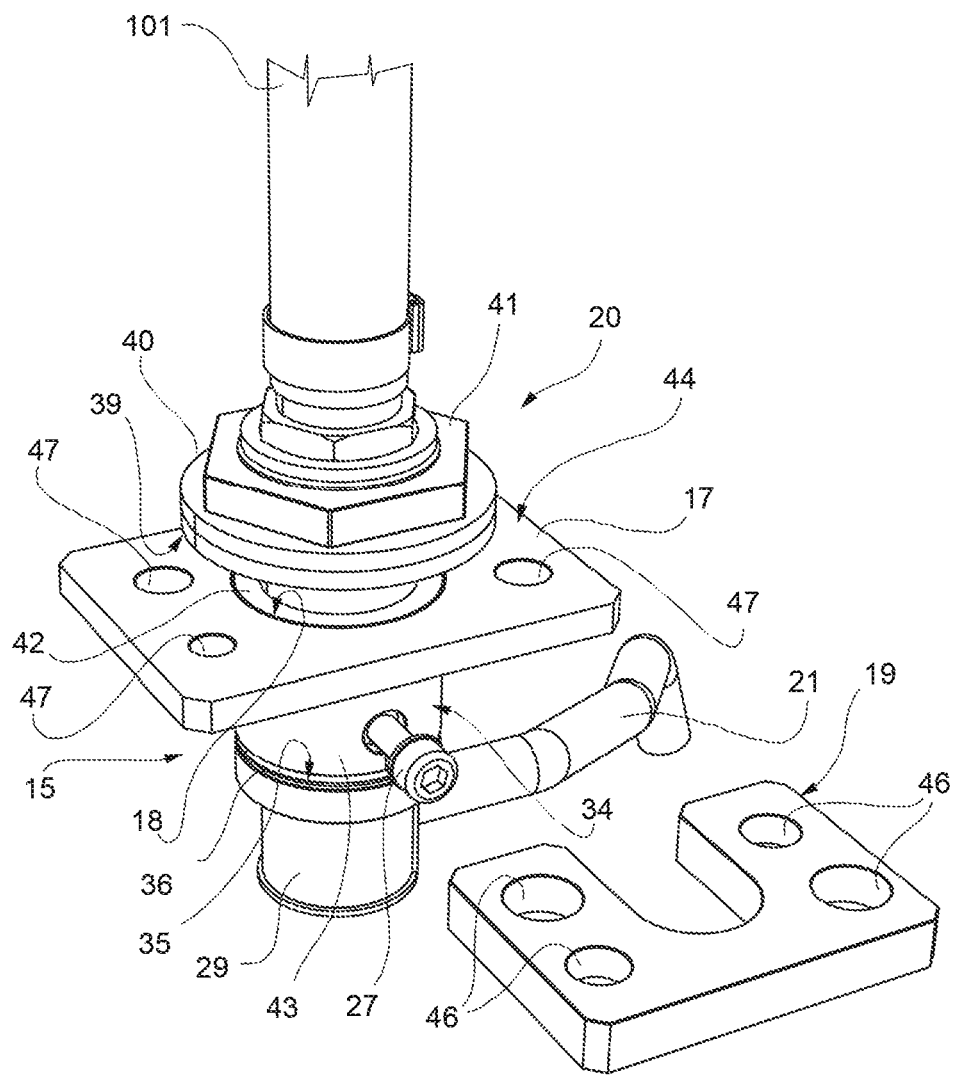
FIG. 5 is a partially assembled perspective view of the components in FIG. 4, and FIGS. 6A and 6B show two assembly phases of the axle box-bearing unit in FIG. 1 according to a possible variant of a sensor component of same.

As shown in FIGS. 4 and 5, the U-shaped second plate 19 is coupled beneath an axial annular shoulder 39 (FIGS. 4 and 5) rigidly connected to the first end 20 of the plug 15 on the side opposite the first plate 17. In particular, the U-shaped plate 19 is inserted between the first plate 17 and the axial annular shoulder 39 in overlapping contact with the plate 17.

The shoulder 39 maybe formed integrally from the plug 15 or, as in the example shown, provided using one or more washers 40 secured using a lock nut 41. Furthermore, according to the non-limiting example shown, the plug 15 has a second axial annular shoulder 42 that, as shown in FIG. 4, is formed by increasing the diameter of a central portion 43 of the plug 15. The central portion 43 is cylindrical, is provided with the seat 35 for the O-ring 36 and is designed to engage and close the holes 14 and 18 in a fluid-tight manner. The diameter of the central portion is greater than the two opposite ends 20 and 29 of the plug 15, which are also cylindrical in the example shown, in particular the end 20 is cylindrical such as to enable coupling with the nut 41 and the washers 40, and the difference in diameter with the central portion 43 creates the annular shoulder 42.

The annular shoulder 42 is arranged to face the shoulder 39, which is opposite same, and is arranged when in use to be flush with an upper flat front surface 44 of the plate 17 (FIG. 5). Thus, inserting the U-shaped plate 19 between the shoulders 39 and 42 and in contact with the flat surface 44, axially secures the plug 15 in the holes 14 and 18, both from the inside out and from the outside in.

Indeed, the plate 19, when in use and as described above, is rigidly connected to the plate 17, in the example shown in FIGS. 4 and 5, using screws 45 (or similar removable securing means) which also secure the plate 17 on/against the housing element 4 and are inserted into four corresponding holes 46 in the place 19 and four holes 47 in the plate 17, each hole 46 being coaxial with the hole 47 in the underlying plate 17.

In order to correctly connect the plates 17 and 19, which are flat, to the annular housing element 4, this latter is provided with a flat circumferential protuberance 48 at least at the hole 14 (in the example shown, there are five protuberances 48 arranged in a ring and positioned equidistant from one another).

Alternatively, according to the embodiment shown in FIG. 3, the second U-shaped plate 19 is coupled laterally using the respective opposing lateral prongs 49 of same in respective tangential recesses 50 formed in one stretch 51 of the cylindrical lateral wall 34 of the plug or adapter 15 that the limits the central portion 43 of same. The stretch 51 projects radially above the plates 17 such that same can be engaged by the second plate 19, which bears against the first plate 17.

In this case, the shoulders 39 and 42 are no longer strictly necessary and may be omitted, as is the case in the embodiment in FIG. 3. Alternatively, just one of the shoulders 39, 42 may be included, depending on the shape and axial position of the recesses 50.

Finally, according to the embodiment in FIG. 3, the plate 19 is linked to the first plate 17 by a pair of screws 52 (or similar removable securing means) that are different from the screws 45 linking the first plate 17 to the annular lateral wall 13 of the housing element 4. This enables the plate 17 to be installed on the housing element 4 first, before subsequently assembling the sensor unit 6 or 6b.

The housing element 4 is provided with a front through seat formed by an axial hole 28 that transversely reaches the hole 14 and receives a screw 27 or other removable connecting means. The screw 27 transversely engages the plug or adapter 15 (FIGS. 4 and 5) to prevent same from rotating in relation to the inside of the holes 14 and 18. The plug or adapter 15 is also provided with a reference pin 53 (FIG. 4) that extends above the plug 15 parallel to and beside the first end 20, the diameter of said pin being less than the central portion 43 of the plug 15 to engage a recess 54 formed in the second plate 19.

Preferably, in particular in the embodiment shown in FIGS. 4 and 5, the electrical data-transmission cable 10 is protected outside the housing element 4 by a second pipe, which is preferably flexible, indicated using reference sign 101 and rigidly connected to the end 20 of the plug or adapter 15.

The assembly system described for the sensor unit 6 or 6 b using the two plates 17 and 19, one of which is provided with an additional sealing system, helps to significantly improve the seal against external contaminants and to reduce the size of the sensor unit, making same easier to assemble. Finally, a sensor unit such as the sensor unit 6 b, in which the sensor module is made of two parts, in which the fastening flange can slide along the electrical cable 10 and/or the protection pipe 21, enables the use of larger sensor modules that are able to monitor more operating parameters of the axle box-bearing unit.

All of the objectives of the invention are achieved thus.

The invention claimed is:

1. A sensorized axlebox-bearing unit for supporting a railway axle, comprising:
   an axle box configured to receive the railway axle in a rotatable manner by means of a rolling bearing and provided with a stationary housing element, and
   a sensor unit including a sensor module connected integral to the axle box and provided with a plurality of transmission elements configured for monitoring the axle and the bearing, a connection piece configured to be connected to an electronic processing unit and a data transmission flexible electrical cable connecting integral in one piece the sensor module with the connection piece, wherein
   the stationary housing element is bounded by an annular lateral wall provided with a first through hole formed radially through the annular lateral wall of the housing element;
   the sensor unit is mounted within the housing element through the first through hole,
   the sensor unit also provides a plug or adapter fitted in a fluid-tight manner on the data transmission flexible electrical cable between the sensor module and the connection piece and configured to be inserted radially in the first through hole to seal in a fluid-tight manner the first through hole,
   the axlebox-bearing unit further including a first plate having a second through hole formed transversely through the first plate; the first plate being integrally constrained with the annular lateral wall of the housing element, externally to the same and with the second through hole aligned coaxially with the first through hole, the first plate being crossed through by the plug or adapter, and
   the axlebox-bearing unit also including a second, U-shaped plate, which is fitted astride of the plug or adapter for coupling with a first end of the plug or adaptor, projecting radially from the first and second through-hole on the outside of the stationary housing element and is rigidly fixed, in a removable way, to the first plate to mechanically lock the plug or adaptor through the annular lateral wall of the stationary housing element.

2. The sensorized axlebox-bearing unit according to claim 1, wherein the plug or adaptor of the sensor unit has a second end, opposite the first one, and wherein the second end is arranged inside the housing element, radially projecting from the annular lateral wall within the housing element; on a first side of the second end of the plug or adaptor protruding in tangential direction with respect to the annular lateral wall of the housing element a flexible pipe, having transverse dimensions less than those of the first and second through hole and which houses, inside thereof, a first length of the data transmission flexible electrical cable disposed between the plug or adaptor and the sensor module so that the first length of the data transmission flexible electrical cable remains bent sideways with respect to the plug or adaptor and adjacent to a lateral inner surface of the lateral wall of the housing element.

3. The sensorized axlebox-bearing unit according to claim 2, wherein the sensor module is integrally supported by a first end of the pipe, opposite to the plug or adapter.

4. The sensorized axlebox-bearing unit according to claim 2, wherein the sensor module includes a casing and a fixing flange integrally formed in one piece with the casing and arranged parallel to a maximum extension of the casing that develops in a longitudinal direction and substantially parallel to the first end of the pipe; the sensor module having, perpendicularly to the longitudinal direction, transverse dimensions less than those of the first and second through hole.

5. The sensorized axlebox-bearing unit according to claim 2, wherein the sensor module provides a casing and a fixing flange, the casing being arranged, in the longitudinal direction of maximum extension thereof, substantially parallel to the pipe and the fixing flange being arranged transversely to the casing and the pipe; the fixing flange being formed as an independent element from the casing and being provided with a through slot by means of which the flange is fitted on the pipe and can slide along the same and which is insertable in a sliding manner on the casing on the side of a first end of the casing facing towards the pipe and up against a second end of the casing, opposite the first end, and provided with a stop rim; the transverse dimensions of the casing and of the flange, when the slot engages the pipe but not the casing and the flange is arranged askew with respect to the pipe, being less than those of the first and second through hole.

6. The sensorized axlebox-bearing unit according to claim 1, wherein the plug or adapter is delimited by a cylindrical lateral wall that couples with the first and second through hole and is provided at the first through hole with a first annular seat in which a first annular sealing element, of o-ring type, is housed sandwiched between the first through hole and the cylindrical lateral wall of the plug or adaptor; the first plate being provided at the second through hole with a second annular seat in which a second annular sealing element, of o-ring type, is housed sandwiched between the second through hole and the cylindrical lateral wall of the plug.

7. The sensorized axlebox-bearing unit according to claim 1, wherein the second, U-shaped plate, is coupled under an axial annular shoulder supported by the first end of the plug on a side opposite to the first plate, between the first plate and the axial annular shoulder.

8. The sensorized axlebox-bearing unit according to claim 1, wherein the second, U-shaped plate, is coupled laterally, with respective opposite its own lateral prongs, inside respective tangential recesses formed on a length of a cylindrical lateral wall of the plug or adapter that protrudes radially projecting from the first plate, the second plate being supported in abutment onto the first plate.

9. The sensorized axlebox-bearing unit according to claim 1, wherein the second plate is constrained to the first plate by means of screws or similar removable locking means, which preferably also constrain the first plate to the annular lateral wall of the housing element.

10. The sensorized axlebox-bearing unit according to claim 1, wherein the housing element is provided, at the front, with a through seat that reaches transversely the first hole and houses a screw or other removable connecting means engaging transversely with the plug or adapter to block any possible relative rotation inside the first and second hole; the plug or adapter also provided with a reference pin that extends projecting from the plug parallel and to the side of the first end of the stopper to engage a recess of the second plate.

\* \* \* \* \*